United States Patent

[11] 3,555,237

[72] Inventor Joseph J. Riley
  Warren, Ohio
[21] Appl. No. 714,606
[22] Filed Mar. 20, 1968
[45] Patented Jan. 12, 1971
[73] Assignee The Taylor-Winfield Corporation
  Warren, Ohio

[54] CONTROL OF MOVABLE PLATEN OF FLASH-BUTT WELDING MACHINE
  7 Claims, 7 Drawing Figs.
[52] U.S. Cl. .................................................. 219/97, 219/100
[51] Int. Cl. ....................................................... B23k 11/04
[50] Field of Search ............................................ 219/97, 100

[56] References Cited
UNITED STATES PATENTS
3,015,021 12/1961 Wangsjo et al. .............. 219/97
3,335,257 8/1967 Sakharnov et al. ........... 219/97(X)
Primary Examiner—J. V. Truhe
Assistant Examiner—R. O'Neill
Attorney—William J. Ruano ABSTRACT: A solid state control system for a flash-butt welding machine for controlling a movable platen clamping a workpiece to effect "forward" and "retract" movements with respect to a stationary platen clamping a stationary workpiece, through the medium of an electrohydraulic servo valve.

Said control system involves a novel, highly responsive switching circuit which allows reversal of valve current and resulting oil flow by the use of only two transistors, which current reaches adjusted maximum value almost instantaneously, and which circuit includes a logic feature, such that when one transistor is switched "on," the other is automatically switched "off." The circuit also consists of potentiometers and diodes shunting them, in series with the servo valve coil, such that one potentiometer setting for maximum coil "retraction" current has no influence on the other potentiometer setting for maximum coil "forward" current, making the settings independent of each other. The control system also involves an indicator circuit consisting of transistors and highly responsive neon lamps which indicate valve current reversal up to double line input frequency. The control circuit also includes an input or feedback circuit from the welding dies, rectifying the voltage which is applied to a Schmitt trigger so that the "forward" switching transistor can be made to conduct over an interval of 150 to 0 electrical degrees through adjustment of a potentiometer in conjunction with the setting of another potentiometer through a 3 to 1 input range of welding die voltage. This input circuit may include a capacitor to allow the forward switching transistor to conduct through the full 180° interval so as to reduce valve mechanical wear and yet be responsive to a reduction in die voltage if the workpieces butt sufficiently hard to reduce weld resistance and die voltage.

INVENTOR.
JOSEPH J. RILEY

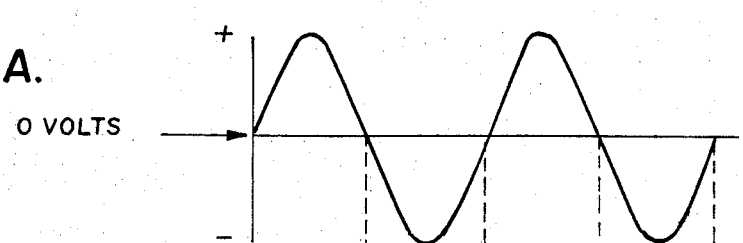
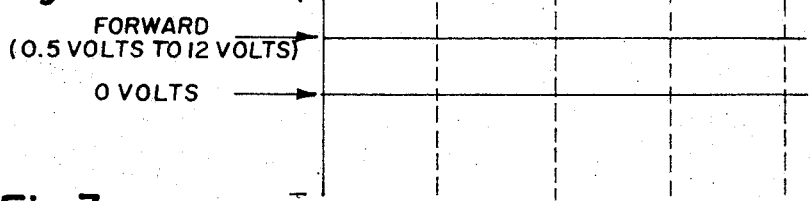
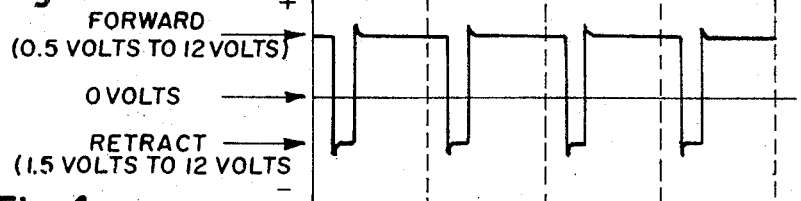
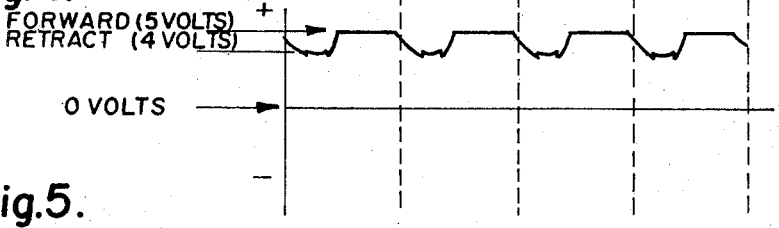
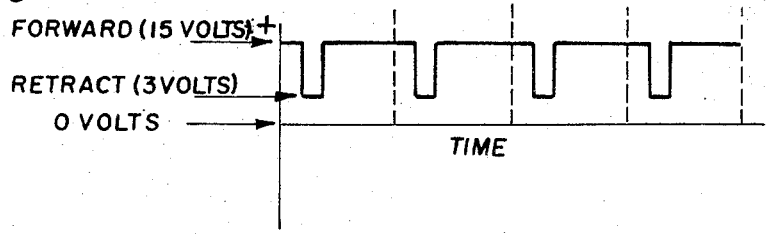

CONTROL OF MOVABLE PLATEN OF FLASH-BUTT WELDING MACHINE

This invention relates to improvements in an electric control system for controlling a movable workpiece clamping platen of a flash-butt welding machine, utilizing an electrohydraulic servo mechanism and, more particularly, to a solid state control system embodying various novel and highly useful control features.

An outstanding disadvantage of control systems for flash welding apparatus used heretofore is their lack of response or failure to faithfully respond to electrical conditions of the arc or electrical path between the workpiece.

Another disadvantage of prior systems is the less than optimum weld qualities and the loss of production time from either poor welds or increased maintenance of apparatus, which loss of production time in a continuous process line involves several thousands of dollars per hour and wherein the reduction of weld quality is particularly costly when failing to meet specifications.

Another disadvantage of commonly used control systems is that abnormally high kilovolt amperes are required to produce a given flash-but weld.

An object of the present invention is to provide a novel control system for flash-butt welding apparatus which will overcome the above-mentioned disadvantages of conventional systems and which will provide welds of very high quality with the consumption of minimum electrical power during the welding operation.

A more specific object of the present invention is to provide a novel electrical control system, embodying an electrohydraulic valve, for moving the movable platen (which clamps a workpiece, such as a steel strip end portion) either "-forwardly" towards the stationary platen which clamps the other strip end portion, or for "retracting" it away from the stationary platen, which movements are responsive to the voltage across the butting ends of said strips which are to be butt welded end to end.

Another object of the invention is to provide a novel switching circuit for controlling an electrohydraulic valve which, in turn, controls the movable platen which clamps a workpiece in a flash-butt welding machine, which switching circuit employs only two transistors Q1 and Q2 to reverse the valve current and resulting oil flow, and which reaches maximum valve current almost instantaneously, and wherein one transistor is automatically switched "off" when the other is switched "on."

A further object of the invention is to include, in the above control circuit, potentiometers P1 and P2 shunted by diodes D1 and D2 and in series with the valve coil for maximum coil "retraction" current with no influence on the other potentiometer setting for maximum coil "forward" current, and thus provide completely independent settings for both.

Still another object is to provide in said control circuit a novel indicator circuit Q5 Q6, Ne1, Ne2 associated with said switching circuit, which indicator circuit is sufficiently highly responsive so as to indicate valve coil current reversal up to double-line input frequency.

A still further object of the invention is to provide, in said control system, an input or feedback circuit from the welding dies, rectifying the voltage which is applied to a schmitt trigger (Q8, Q7 so that the forward switching transistor Q2 can be made to conduct or saturate over an interval of 150 to 0 electrical degrees through adjustment of a potentiometer P3 in conjunction with the setting of another potentiometer P4 through a 3 to 1 input range of welding die voltage, also including a capacitor C1 to allow the "forward" switching transistor Q2 to conduct through the full 180° interval and yet be responsive to a reduction in die voltage if the workpieces butt sufficiently hard to reduce weld resistance and the die voltage.

Still another object of the invention is to provide a method of flash welding which reduces the KVA input power demand by permitting welding at such relatively low secondary voltages as would otherwise cause stalling or cessation of flashing condition if only the conventional programmed typed of platen movement were used, also which method substantially increases welding capacity over conventional methods.

Other objects and advantages will become more apparent from a study of the following description, taken with the accompanying drawings wherein:

FIG. 1a is the voltage wave form of the reference line voltage;

FIG. 2 is the voltage wave form across solenoid coil SC;

FIG. 3 is another voltage wave form across the solenoid coil SC;

FIG. 4 is a voltage wave form at the base of transistor Q8;

FIG. 5 is the voltage wave form at collector Q7; and

Figure 1:
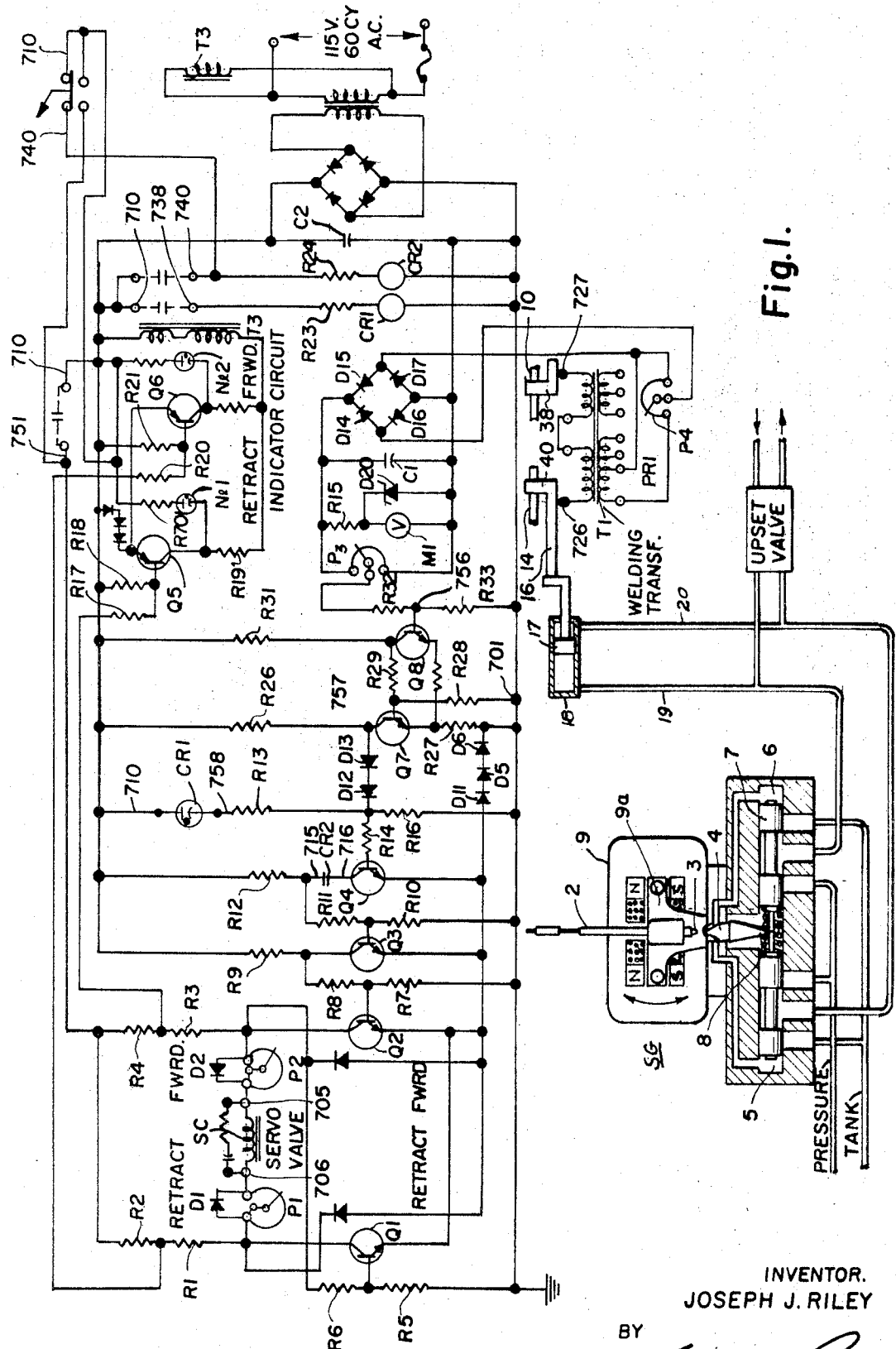
FIG. 1 is an electrical control system for a flash-butt welder including a servo hydraulic valve for moving the movable platen and which involves a novel solid state control embodying various features of the present invention.

Referring more particularly to FIG. 1 of the drawing, which shows a control system for a flash-butt welder, numeral 10 denotes a workpiece, such as the end portion of a continuous metal strip, which is clamped on a stationary platen 38 and cooperates with a movable workpiece 14, such as the end portion of another metal strip, to be welded to the stationarily held strip 10 and which is clamped on movable platen 40 and by means of an extension 16, connected to and operated by a piston 17 which is reciprocable in a hydraulic cylinder 18 as the result of hydraulic pressure flowing either through line 19 or 20 to effect "forward" movement of platen 40 or "retracting" movement, respectively.

Cylinder 17 may be reciprocated by any suitable hydraulic servo mechanism desired, that is, by any conventional type of hydraulic servovalve.

However, the particular hydraulic servovalve shown in the lower left hand corner of FIG. 1 is s especially useful since it resists fine particle contaminants. Control oil is fed through conduit 2 to a jet nozzle 3 which squirts the oil on two holes in the receiver 4 which connect to passages leading to the spaces 5 and 6 at the ends of a spool 7. With the nozzle 3 centered over the receiver, forces on the spool ends remain neutral and the spool is held stationary.

Current applied to the torque motor 9 causes the nozzle 3 and feedback arm 9a to pivot. Thus, more control oil is directed to one side of the receiver than the other, producing an unbalanced force on the spool. The spool shifts causing a flow proportional to applied torque motor current to be directed from one cylinder port to an actuator. Actuator return oil is also proportionally metered upon entering the other cylinder port.

Spool movement also simultaneously compresses the feedback spring 8 connected to the feedback arm 9a carrying the jet nozzle 3. Thus the arm and nozzle are returned to their original position, that is, in central alignment with the receiver 4 due to the feedback spring overcoming the force of the torque motor. Force balance is established, but at a new spool position proportional to the current in the torque motor.

It should be noted that the present invention is not concerned with the specific details of the servovalve or electrohydraulic servomechanism itself, since any type of servovalve may be used so long as it is based on the principle of controlling hydraulic liquid flow in accordance with current flow through the servovalve and which can reverse the hydraulic oil flow. as the result of reversal of current flow through the servovalve SC, such as illustrated schematically in FIG. 1.

Therefore, the control system will be described as comprising the basic elements shown in FIG. 1 including a servovalve of any well-known type, including a servo coil SC through which control current flows, so as to control hydraulic pressure in conduits 19 and 20 in substantial accordance with the valve of current flow and the direction of current flow.

BASIC OPERATION

The function of the servovalve or solenoid governor SG during a flashing cycle is to control the flashing by governing the platen 40 movement. The solenoid governor is regulated by the flashing voltage present across the welding dies. Solid state switching means Q1, Q2 controls the direction of current and the potentiometers P1, P2 control the amount of current through the coil SC of the hydraulic solenoid valve. The rate of oil flow through the valve is proportional to the amount of current in the coil, and the direction of oil flow through the valve reverses as the direction of current in the coil is reversed. The direction of oil flow through the valve controls "forward" and "retract" platen 40 movement, and the rate of oil flow controls the speed of platen movement. The solenoid governor sensing the flashing voltage, controls the platen movement in accordance with the level of flashing voltage. Note that a complete absence of flashing voltage will result in the solenoid governor causing full platen retraction. A high flashing voltage can cause continuous forward platen movement.

During normal flashing, the platen 40 must move in a way which continually brings the movable workpiece 14 toward the stationary one 10. This direction is being termed "forward." It follows that movement in the reverse direction is "retract." While it is true that the overall movement of the platen during flashing is forward, the solenoid governor is actually causing both forward and retract movement, switching from one to the other.

The solenoid governor can cause "forward" and "retract" movement during each half cycle of flashing voltage. The greatest portion of each half cycle will normally be "forward" movement. Since the greatest portion of each half cycle is "forward" movement, the result is "forward" movement of the platen. The portion of "forward" movement per each half cycle may increase or decrease during flashing. This is directly controlled by the level of flashing voltage. A decrease in the level of flashing voltage results in a reduction of the amount of "forward" platen movement per each half cycle. An increase of flashing voltage results in an increase of the amount of "forward" platen travel per each half cycle. A reduction of the amount of "forward" platen movement per each half cycle, automatically results in an increase in the amount of "retract." An increase of "forward" movement results in a decrease of "retract" movement.

At the starting level of flashing voltage, the solenoid governor causes "forward" platen movement during the entire 180° of each half cycle of flashing voltage (See FIGS. 1a and 2).

The speeds of "forward" and "retract" platen travel are determined by the "forward" and "retract" adjusters P2, P1, respectively.

Since the solenoid governor is causing "forward" movement of the platen, the workpieces will come together. As the work pieces touch, the voltage across the dies decreases. A decrease in the voltage will result in the solenoid governor causing retraction per each half cycle.

The amount of retraction per each half cycle will increase as the level of flashing voltage decreases. See FIG. 3. The period of retraction per each half cycle results in a retarding of forward platen travel.

Due to the retarding of platen travel and the material loss from burn off, a gap is created between the workpieces 14, 10. The voltage across the welding dies increases. The solenoid governor senses the increase in voltage and causes the amount of forward platen travel per each half cycle to increase thus reducing the amount of retraction.

The retarding effect on the platen is reduced and the platen will move forward more rapidly until the workpieces again touch and the flashing voltage decreases.

The operation just described continues during the entire flashing cycle. The flash is controlled by the movement of the platen 40. If the platen moves forward too rapidly, voltage across the dies decreases and causes retraction, or a reduction of forward platen travel. If the speed of forward travel were not reduced, the workpieces would come together and remain together under pressure, thus causing the flashing between the workpieces to stop. This condition is termed a stall. The solenoid governor prevents stalling in the manner just described.

As the platen 40 retracts, the workpieces 14, 10 pull apart and flashing resumes. If the workpieces were allowed to get too far apart, the gap resistance between the workpieces would be too great for flashing to continue and the flashing would stop. The solenoid governor also prevents this condition as an increase in voltage across the welding dies would result in the solenoid governor causing forward platen movement.

2 indicates that the forward voltage across the valve coil can be adjusted by potentiometer P2 to vary from 0.5 volts to 12 volts. The coil current will vary accordingly.

FIG. 3 indicates the same thing plus the fact that the Retract voltage across the valve coil can be adjusted by potentiometer P1 to vary from 1.5 volts to 12 volts. The coil current will vary accordingly.

FIG. 4 is a representation of voltage at transistor Q8's base. If the voltage is 5 volts or more, transistor Q8 is conducting and forward motion should take place. If the voltage decreases to 4 (or something below 5 volts) transistor Q8 goes off or out, and transistor Q7 conducts because of the Schmitt trigger action.

Figure 6:
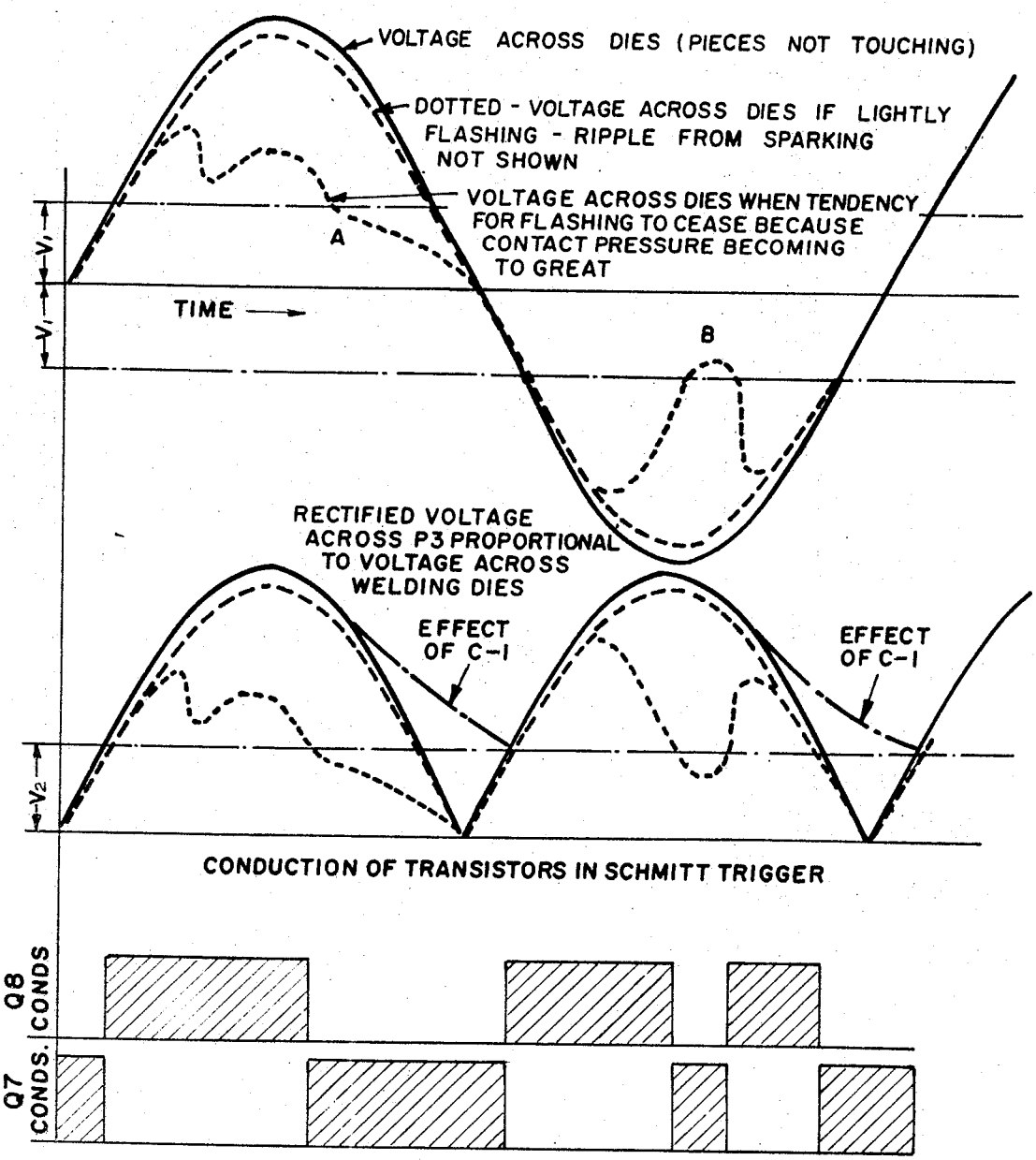
FIG. 6 shows voltage wave forms across the dies under different conditions and the rectified voltage across potentiometer P3.

FIG. 6 shows the voltage wave form across the dies under different conditions of the dies. It has been assumed that capacitor C1 isn't connected.

When the pieces do not touch, the voltage (solid line) is set by the welder transformer secondary and is effectively the open circuit voltage.

When flashing is continuous, that is, the velocity of the platen and available power have the correct relationship, the voltage (dotted line) will become lower than the solid line because the low value of flashing current will cause a voltage drop in the inductive welder circuit. The high frequency ripple from the sparking action is not shown.

The control is designed so that when either of the above voltage fall below a level indicated as V., valve retraction begins. In other words, if the voltage is greater than V., the valve is signaled Forward; if less, the valve is signaled Retract.

The aforementioned voltages are rectified by the bridge D14, D15, D16, D17 and appear across the potentiometer P3 whose slider is indirectly tied to transistor Q8 base. A voltage level V2 is shown on this waveform. If the voltage is higher than V2, transistor Q8 will saturate or conduct. If lower (neglecting the small degree of hysteresis), transistor Q8 will cease conduction and transistor Q7 will snap into saturation or conduction, transistor Q7 conduction effectively signals a Retract condition, transistor Q8 conduction, a Forward condition.

The V2 voltage is designed into the control. It is the triggering level for transistors Q8 and Q7 to change state. V1 is shown only to help understanding. It is proportional to V2, set by potentiometers P4 and P3.

Referring back to the AC voltage across the dies. The heavy dotted line indicates the stumbling condition. The platen starts to move forward as soon as the voltage exceeds level V1. The contact area between the pieces starts to increase, lowering the resistance, and lowering the voltage across the dies. This continues to happen until point A is reached. The voltage is now lower than V1, transistor Q goes out, transistor Q7 conducts, the platen retracts until the voltage exceeds V1 in the next half cycle. Transistor Q8 then conducts for Forward movement until point B is reached. The voltage again being lower than V1, transistor Q7 conducts signaling retraction until the voltage again rises above the V1 level.

In actual operation of a flash welder, there is a rapid pattern of this forward-retract signaling in the early part of the flashing cycle but as the pieces heat up, requiring less energy to burn away the metal, the percentage of time increases for Forward signaling (and correspondingly decreases for Retract signaling) until the flashing action is over. The voltage curve approaches the one shown for voltage across the dies if lightly flashing.

In a flash welder, because it has a mechanical time constant much larger than the electronic circuitry, actual reversal of platen travel (due to retraction signaling) would only take place in the early portion of the flashing cycle. After a time, the "retract" signal results in the platen momentarily slowing down rather than reversing.

The dot and dash line shows capacitor C1 effect.

After the workpieces have flashed long enough, they will be butted together during upset. The point of upset is determined by machine operation, (for example by the use of a limit switch not shown). When the external switch is operated, the solenoid governor will cause the platen to move full forward. There will be no retraction applied to the platen at all. At the proper time (after unclamping the dies), as determined by machine operation, the solenoid governor will cause the platen to move full "retract" to open the welding dies. The full retract pressure can be maintained on the platen until the next flashing cycle. This is controlled by the three external switches.

The terminals for these three external switches are 751 to 710; 738 to 710; and 740 to 710. The sequence of operation of the external switches will depend upon the desired functions of the solenoid governor. The external switch between terminals 751 to 710 must be open to electrically deactivate the solenoid governor.

CONTROL ADJUSTMENTS

1. Rate of Platen Travel

Potentiometer P1 is used to adjust the speed of platen movement when the platen travels in "retraction" A dial plate has been provided with a scale from 0—100 in order to facilitate repeat ability of settings.

Potentiometer P2 is used to adjust the speed of platen movement when the platen travels in "forward" direction. A dial plate has been provided with a scale from 0—100 in order to facilitate repeat ability of settings.

Potentiometers P1 and P2 should be adjusted for the best welding performance in each case.

2. Voltage Pickup

Potentiometer P4 is used to adjust the level of voltage being picked up across the welding dies to the specific level required for the solenoid governor input. The level of flashing voltage (secondary) will change any time the welding transformer primary taps are changed or the geometry and material of the workpieces are changed.

3. Voltmeter

The purpose of the voltmeter M1 is to monitor the level of voltage being picked up by the solenoid governor. For proper operation of the solenoid governor, the voltmeter should indicate a reading of 7 to 11.4 volts during setup. The voltmeter reading should be set to the specified 7 to 11.4 volts by adjusting voltage pickup potentiometer P4.

4. Sensitivity

The setting of the sensitivity potentiometer P3 is a factory adjustment and should not require any adjustment by the machine operator. The setting of potentiometer P3 will determine what portion of the input voltage signal is fed into the control circuit. In this way potentiometer P3 is used to control the sensitivity of the solenoid governor with respect to the flashing voltage.

5. Indicating Lamps

Lamp Ne1 is lit anytime current is flowing through the coil of the hydraulic solenoid valve in a direction required to cause platen retraction.

Lamp Ne2 is lit anytime current is flowing through the coil of the hydraulic solenoid valve in a direction required to cause "forward" platen movement.

When neither lamp is lit it indicates that the coil of the hydraulic solenoid valve is not energized for travel in either direction.

THEORY OF OPERATION

With the solenoid governor completely deactivated, that is, when all three external switches are open, no flashing voltage is applied, and the coil SC of the hydraulic solenoid valve is deenergized, the following transistors are conducting in the saturated state; transistors Q3, Q5, Q6 and Q7.

Transistor Q3 is supplied with base drive through the resistor network of R10, R11 and R12. Transistor Q5 base drive is provided by a current through resistors R18, R17, R3, R6, R5. Transistor Q6 base drive is supplied through resistor network R21, R20, R2, R4, R3, R6 and R5. Transistor Q7 base drive is provided by resistor network R31, R29 and R28. All other transistors are cut off (not conducting).

Since both transistors Q5 and Q6 are conducting, neon lamps Ne1 (retraction) and Ne2 (forward) are shunted and will not light. This is an indication to the operator that the solenoid governor is deactivated and therefore not causing either forward or retract platen movement.

STANDBY

Standby is that condition when the platen 40 is fully retracted and maintained in the that position. The flashing voltage has not yet been applied. In order to go from a condition of the solenoid governor deactivated to the standby condition, the external switch between terminals 751 to 710 must be closed. Closing the switch applies DC voltage to the collectors of transistors Q1 and Q2. Since transistor Q3 is conducting, transistor Q2 is reverse biased and therefore remains cut off.

Transistor Q1 is forward biased through the resistor network R4, R3, R6, R5 and therefore conducts. Note that transistor Q1 can conduct only when transistor Q2 is cut off.

When transistor Q2 conducts, transistor Q1 is reverse biased and is cut off. With transistor Q1 conducting, current will flow through resistors R4, R3, diode D2 (shunting potentiometer P2), the coil SC of the hydraulic solenoid valve, potentiometer P1 (retraction), transistor Q1, and diodes D11, D5, D6 to complete the circuit. The speed at which the platen retracts is controlled by potentiometer P1. Potentiometer P1 controls the amount of current flowing through the coil of the hydraulic solenoid valve. The rate of oil flowing through the hydraulic solenoid valve is proportional to the amount of current flowing through the coil of the hydraulic solenoid valve.

Closing the external switch between terminals 751 to 710 also applies DC voltage to the base circuits of transistors Q5 and Q6. Since positive voltage has been applied to the base of transistor Q5, transistor Q5 is reverse biased and cut off. The neon indicating lamp Ne1 is no longer shunted by transistor Q5. Current can now flow through resistor R701, neon indicating lamp Ne1 and resistor R19 to cause neon indicating lamp Ne1 to light. Transistor Q6 is forward biased by resistor network R21, R20, R1 and transistor Q1 conducting. Neon indicating lamp Ne2 is still shunted by transistor Q6 and remains off. The condition of neon indicating lamp Ne1 lit and neon indicating lamp Ne2 off indicates to the machine operator that the platen is in "retract" position.

FLASHING

To initiate flashing, the following conditions must be fulfilled:
1. The external switch between terminals 710 to 740 must be closed; and
2. Voltage must be present across the welding dies.

Closing the external switch (or relay contact) between terminals 710 to 740 causes relay CR2 to be energized through resistor R24. The energizing of relay CR2 causes the normally open contacts of relay CR2 to close between lines 715 to 716 thus closing the circuit going to the collector of transistor Q4. By completing the collector circuit of transistor Q4, it is now possible to control the state (either conducting or cut off ) of transistor Q3 by the state of transistor Q4.

The platen will not travel forward, but will remain in "retract," until voltage is applied across the welding dies. If voltage across the welding dies drops to a very low level or is completely removed at any time during the flashing cycle, the platen will retract.

When voltage is applied across the welding dies, it is fed into the solenoid governor at terminals 726 and 727. Transformer T1 is used to step up the voltage signal. Potentiometer P4 is connected across the secondary winding of transformer T1. The solenoid governor is designed to operate at a specific constant level of voltage input. The level of voltage present across the welding dies will change any time the taps of the welding transformer are changed or the geometry and material of the workpieces are changed.

By adjusting potentiometer P4, the voltage being fed into the solenoid governor can be set to the specific level required. The AC voltage is rectified by the full wave bridge consisting of diodes D14, D15, D16, D17. Capacitor C1 is used to filter the sharp transients present in the wave form. Capacitor C1 also acts as a filter for the DC voltage and allows forward switching transistor to conduct through the full 180° interval. Since the voltage does not go below a predetermined value sufficiently to reverse the state of the circuit of transistors Q7 and Q8, signalling reversal of the valve, there will not be mechanical wear. However, when the workpieces butt, the voltage will drop sufficiently to reverse the valve.

The rectified voltage is applied across potentiometer P3 and voltmeter M1. The voltmeter M1 is used to monitor the level of voltage being picked up.

Resistor R15 is used to limit the current through the voltmeter M1 and zener diode D20. Voltmeter M1 is a DC voltmeter with a range of 0—15 volts. For proper operation of the solenoid governor, potentiometer P4 should be adjusted to give a reading of approximately 11.4 volts on voltmeter M1 for the setup condition. If potentiometer P4 is not properly adjusted, voltages in excess of 15 volts DC can be applied across voltmeter M1. The zener diode D20 has a 15 volt breakdown. The purpose of zener diode D20 is to prevent damage to voltmeter M1 due to excessive voltage.

As stated previously, the rectified voltage is applied across potentiometer P3. The voltage is fed through the wiper of potentiometer P3 to the voltage divider formed by resistors R32, R33.

The reduced voltage signal is applied to the base of transistor Q8. The solid state switch circuits respond to the level of input voltage. A decrease in the amount of voltage signal supplied to the base of transistor Q8 will decrease the amount of response the solenoid governor will have to the flashing voltage.

In other words, decreasing the level of voltage supplied to the base of transistor Q8 makes the solenoid governor less sensitive. The level of voltage applied to the base of transistor Q8 is determined by the setting of potentiometer P3 (Sensitivity).

Transistors Q7 and Q8 and associated resistors make up a schmitt trigger. The schmitt trigger is used as a voltage actuated switch to control the DC voltage used to forward and reverse bias transistor Q4. Using DC voltage levels to switch transistor Q4 results in more accurate control of transistor Q4. The operation of the schmitt trigger is as follows. The rectified voltage is applied to the base of transistor Q8. As the positive slope of the signal increases above 4 volts, transistor Q8 is forward biased and conducts. With transistor Q8 conducting, transistor Q7 is reverse biased and cut off. The collector of transistor Q7 raises to 15 volts DC as the rectified voltage applied to the base of transistor Q8 continues to its peak value and has no affect on the output of the schmitt trigger which is the collector of transistor Q7. The collector of transistor Q7 remains at 15 volts DC. As the negative slope of the rectified voltage decreases to 4 volts, or below (to its minimum value), transistor Q8 will be reverse biased and cut off. At this point, transistor Q7 will conduct, thus reducing its collector voltage to approximately 3 volts DC as determined by the voltage divider effect of resistors R26 and R27. Therefore, the output of the schmitt trigger will be either 3 volts DC or 15 volts DC, thus converting the rectified AC signal applied to the base of transistor Q8 into the square wave output present at the collector of transistor Q7. (See FIG. 4 and FIG. 5).

The output of the schmitt trigger controls transistor Q4. When transistor Q7 is cut off, transistor Q4 is forward biased through resistor R26, diodes D12 and D13, and resistors R14, R16 and conducts. When transistor Q7 is conducting, transistor Q4 is reverse biased through resistors R14 and R16 and cuts off. Transistor Q4 controls transistor Q3. If transistor Q4 is cut off, transistor Q3 is forward biased through resistors R10, R11 and R12 and conducts. If transistor Q4 is conducting, transistor Q3 is reverse biased through resistors R10, R11 and R12 and is cut off. Transistor Q3 controls transistor Q2. If transistor Q3 is cut off, transistor Q2 is forward biased through resistors R7, R8 and R9 and conducts. If transistor Q3 is conducting, transistor Q2 is reverse biased through resistors R7, R8 and R9 and is cut off.

By means of the switching circuits just explained, transistor Q2 is controlled by the rectified voltage being fed to the base of transistor Q8. In other words, as the rectified voltage applied to the base of transistor Q8 increases above 4 volts, transistor Q2 will conduct during each half cycle of flashing voltage. The portion of each half cycle during which transistor Q2 conducts depends entirely on the level of flashing voltage. If the flashing voltage increases, the rectified signal applied to the base of transistor Q8 increases and the 4-volt level required to forward bias transistor Q8 is reached sooner in the half cycle. The result of an increase in flashing voltage is an increase in the portion of each half cycle during which transistor Q2 conducts. Likewise, the results of a decrease in flashing voltage is a decrease in the portion of each half cycle during which transistor Q2 conducts.

When transistor Q2 conducts, the collector of transistor Q2 drops to near 0 volts. Transistor Q1 is reverse biased and therefore cut off. The current flow through the coil of the hydraulic solenoid valve is reversed. The current now flows through resistors R2, R1, diode D1 (shunting potentiometer P1 retract), the coil of the hydraulic solenoid valve, potentiometer P2 (forward), transistor Q2, and diodes D11, D5, D6.

The amount of current through the coil of the hydraulic solenoid valve is now determined by the setting of potentiometer P2. Since the rate of oil flow through the valve is proportional to the amount of current in the coil, the speed of forward platen travel is controlled by potentiometer P2.

During flashing, transistor Q2 is continually being turned on and off. If transistor Q2 is conducting, transistor Q1 is automatically cut off and forward platen movement results. If transistor Q2 is cut off, transistor Q1 is conducting and retraction results. Therefore, controlling transistor Q2 with the rectified input signal (by means of switching transistors) is all that is required. In prior devices wherein the platen movement is preprogrammed by a cam, movement of the platen is always in only one direction, that is forwardly since it cannot be reversed satisfactorily. Therefore the secondary voltage must be adjusted 50 to 100 percent higher to avoid the problem. Secondly, once the workpieces butt (flashing stops) the contact is steadily increased due to forward platen movement and flashing will not start again. Effectively the weldment is ruined. By the present invention wherein the platen is reversible, neither of these disadvantages is present and the KVA input power demand is reduced since lower secondary voltages are required, and welding capacity is increased.

Recall that in "standby" when transistor Q1 was conducting, neon indicating lamp Ne1 was lit and neon indicating lamp Ne2 was off. When transistor Q2 is conducting and transistor Q1 is cut off, transistor Q6 is reverse biased and transistor Q5 is forward biased. In this condition, neon indicating lamp Ne1 is shunted and therefore off. Neon indicating lamp Ne2 is no longer shunted and therefore lights. In other words, the neon indicating lamps Ne1 and Ne2 follow the switching of transistors Q1 and Q2. For normal flashing conditions, neon lamp Ne2 (for "forward" indication) will appear to be on continually. The neon lamp Ne1 (for "retract" indication) will appear to be faintly lit or not lit at all. If for any reason flashing voltage is not present, neon lamp Ne2 will turn off and neon lamp Ne1 will come on brightly to indicate retraction of the platen.

UPSET

At the proper time, as determined by machine operation (such as a limit switch), upset will occur. For upset, the external switch between terminals 738 and 710 must be closed. Relay CR1 is energized through resistor R23. The normally open contacts of relay CR1 close between lines 710 and 758, the latter connected to resistor R13. A positive DC voltage is now supplied to the base of transistor Q4 through resistor R13.

Diodes D12 and D13 act as blocking diodes to the DC voltage to prevent overloading of transistor Q7. Transistor Q4 now conducts and will continue to conduct regardless of what the output of the schmitt trigger is. This means that transistor Q2 will also conduct and remain conducting regardless of what level the flashing voltage is. Since transistor Q2 is maintained in a conducting state, the platen will move only in a forward direction. There will be no retraction applied to the platen at all.

When upset is over, the external switch between terminals 751 to 710 must be the first switch to open. When this switch opens, power is removed from transistors Q1 and Q2 and the coil of hydraulic solenoid valve is deactivated. At this point the external switches between terminals 738 to 710 and 740 to 710 may be opened. Now the solenoid governor has been returned to the original condition of the control at the start of the "Theory of operation."

POWER SUPPLIES

There are two power supplies used in the solenoid governor. The two voltages supplied are AC voltage for the neon indicating lamps and DC voltage for the switching circuits.

The power requirement for the solenoid governor consists of single phase 115 volts AC.

DC VOLTAGE FOR SWITCHING CIRCUITS

This supply consists of a diode bridge for full wave rectification with a capacitance filter.

The 115 volt AC input is stepped down through transformer T2. Full wave rectification is provided by the rectifier bridge assembly D19. The output of the supply is filtered by capacitor C2. The output should be approximately 32 volts DC.

AC VOLTAGE FOR INDICATING LAMPS

The 115 volt AC is applied to transformer T3 primary. The voltages on the two secondary windings of transformer T3 are 6.3 volts and 125 volts. The two windings are connected in series in a way which adds the 6.3 volts to the 125 volts resulting in approximately 132 volts AC. This voltage is used to light the neon indicating lamps Ne1 and Ne2.

It should be especially noted that all of the values of voltage, current and other parameters given above are merely exemplary of a practical system and that, as will be readily obvious to those skilled in the art, other values may be used instead within the purview of the present invention.

Thus it will be seen that I have provided an efficient and highly reliable control system for effecting intermittent forward and retract movements of a movable platen of a flash butt welder, or similar device, through the instrumentality of an electrohydraulic servovalve and which is responsive to the voltage between the ends of the workpieces which are being flash butt-welded; furthermore, I have provided a method of flash welding which reduces the input power demand (kilovolt amperes) by permitting welding at relatively low secondary voltages which would otherwise cause stalling or cessation of flashing if a conventional preprogrammed type of platen movement, during flashing, were used instead of the novel control system of the present invention; also I have provided a method of welding which allows increased welding capacity of the system over those using conventional means as large compact sections such as rounds, difficult to start and keep flashing, using a preprogrammed type of platen movement, will start flashing immediately on contact and keep flashing during the desired flashing dimension.

While I have illustrated and described a single specific embodiment of my invention, it will be understood that this is by way of illustration only, and that various changes and modifications may be made within the contemplation of my invention and within the scope of the following claims.

I claim:

1. In a control system for controlling the flashing of a flash welding machine including a stationary platen for holding one of the workpieces to be welded and a movable platen for holding the other of the workpieces to be welded the improvement wherein said control system comprises an electrohydraulic valve means including means for reciprocating said movable platen, electrical coil means through which a control current flows responsive to the level of flashing voltage across said workpieces, the direction and amount of said control current flow controlling the direction and rate of flow, respectively, of hydraulic fluid through said electrohydraulic valve; and a high speed switching circuit connected to said electrical coil means for reversing said control current flow each half cycle of an applied alternating voltage through said electrical coil means to provide "forward" and "retract" hydraulic fluid pulses to move said movable platen towards or away from said stationary platen, respectively, whereby an increase in flashing voltage results in an increase in the amount of "forward" platen travel for each half cycle and a reduction in the amount of "forward" platen movement per each half cycle automatically results in an increase in the amount of "retract" movement.

2. A control system as recited in claim 1 wherein said switching circuit includes two alternately conductive transistors for each half cycle electrically connected to said electrical coil means.

3. A control system as recited in claim 2 wherein said transistors are connected so that when either conducts, the other is nonconducting, and that conduction of one transistor causes control current flow in one direction and conduction of the other transistor causes control current flow in an opposite direction in said electrical coil means.

4. A control system as recited in claim 3 together with a pair of adjusting potentiometers connected in series with said electrical coil means, each potentiometer being bridged by a diode, which diodes are reversely connected so that one potentiometer will adjust maximum control current flow in one direction without affecting the adjustment by the other potentiometer of maximum control current flow in an opposite direction through said electrical coil means.

5. A control system as recited in claim 3 together with an indicator circuit connected to said electrical coil and with said switching circuit comprising a pair of transistors connected to a pair of indicating lamps whose response is sufficiently high as to indicate reversal of said control current up to double-line input frequency.

6. A control system as recited in claim 4 together with an input or feedback circuit from the welding dies rectifying a voltage and applying it to a schmitt trigger circuit so that the "forward" switching transistor can be made to conduct over an interval of about 150 to 0 electrical degrees through adjustment of a third potentiometer in conjunction with the setting of a fourth potentiometer through a predetermined input range of welding die voltage 7. A control system as recited in claim 6 together with a capacitor in said feedback circuit to allow the "forward" switching transistor to conduct through the full 180° interval and yet be responsive to a reduction in die voltage if said workpieces butt sufficiently hard to reduce the weld resistance and the die voltage.